JOHN J. BUNDSCHUH
ROBERT G. ELTON
INVENTORS

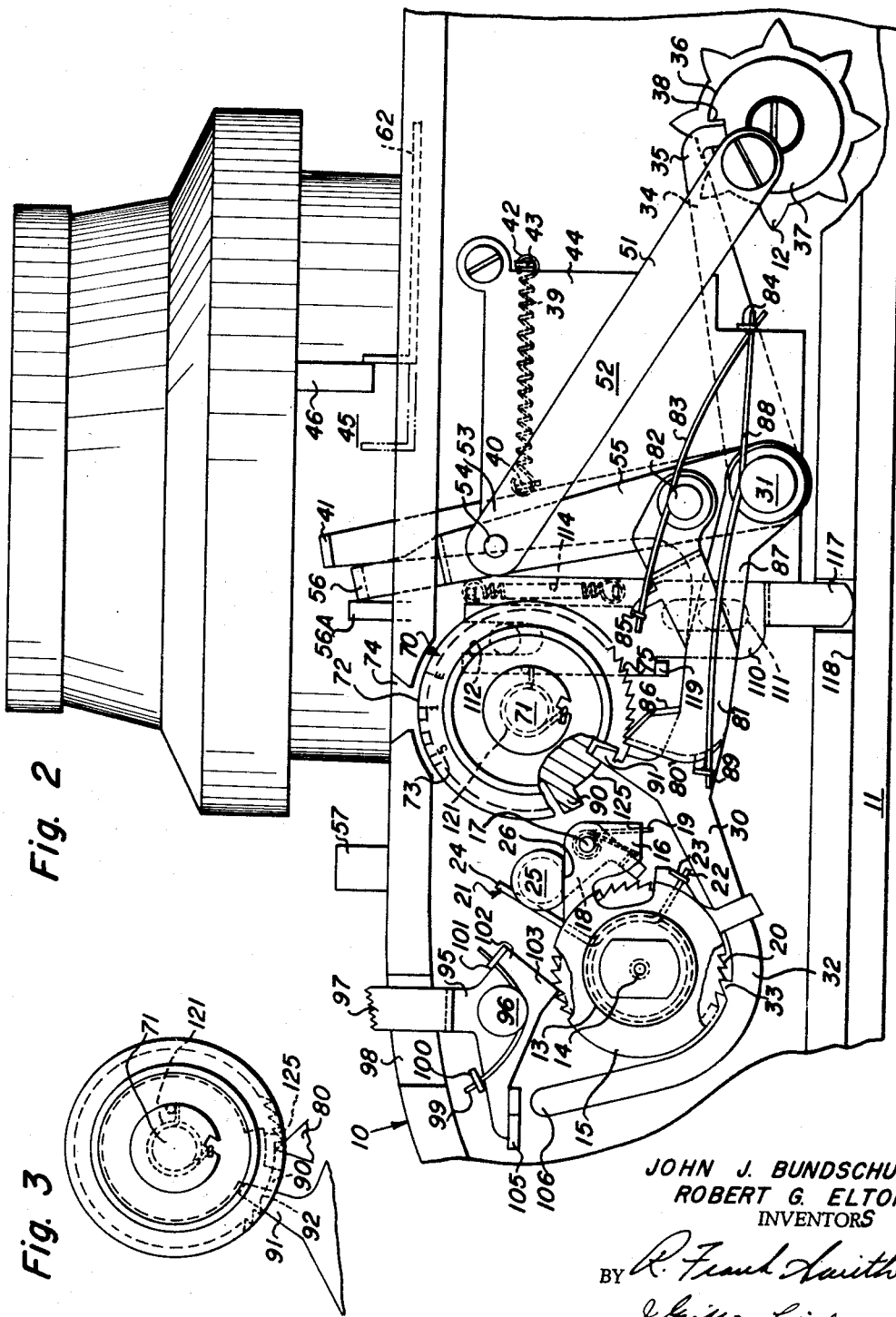

May 17, 1960   J. J. BUNDSCHUH ET AL   2,936,687
METERING AND DOUBLE EXPOSURE PREVENTION MECHANISM
Filed March 27, 1958                    3 Sheets-Sheet 3

JOHN J. BUNDSCHUH
ROBERT G. ELTON
INVENTORS

BY
ATTORNEYS

United States Patent Office 2,936,687
Patented May 17, 1960

2,936,687

METERING AND DOUBLE EXPOSURE PREVENTION MECHANISM

John J. Bundschuh and Robert G. Elton, Rochester, N.Y., assignors to Eastman Kodak Company, Rochester, N.Y., a corporation of New Jersey Application March 27, 1958, Serial No. 724,361

3 Claims. (Cl. 95—31)

The present invention relates to roll film cameras, and more particularly to a film metering mechanism therefor.

As is well known, in cameras of this type, it is desirable to provide a mechanism which will lock the film winding mechanism automatically after each exposed image area has been wound onto the take-up spool or spindle, and the unexposed frame or image area has been moved into exposing position. With such structures, it is desirable to provide an arrangement by which the locking mechanism may be disengaged or rendered inoperative after the last exposure has been made and wound up to permit the free winding of the trailer strip, and also the subsequent winding of the leader strip for the next roll of film.

It has also been common practice to provide such cameras with a counter to indicate the number of exposures which have been made. While various mechanisms have been employed to actuate such a counter, it is preferred to connect the counter mechanism to the film winding device so that the counter is operated from and in timed relation with the film winding or film movement. However, after the last exposure has been made, it is desirable to disconnect the counter so the latter may be reset or zeroed. It is also preferred to move the film-winding locking mechanism to an inoperative position to permit the free and uninterrupted winding of the trailer portion of the exposed film, as well as the subsequent winding of the leader portion of the new film.

To secure this result, the present invention provides a disengageable connection between the film winding and the counter so that the latter is operated from and in timed relation to the film movement. However, when the camera back is open, the counter is completely and automatically disconnected from the winding mechanism and is freed. The freed counter is then returned automatically to its zero or initial position. In addition, the disconnection of the counter serves to move the film-winding locking lever to an inoperative position. After the new film strip is placed in the camera, the camera back is closed, and means on the counter and film-winding lock member cooperate to hold the latter in an inoperative position to permit the free winding of the leader strip. At the completion of this leader winding operation, the winding mechanism is automatically locked and the shutter set in readiness to make an exposure.

The present invention has as it principal object the provision of an arrangement by which the counter is completely and automatically disconnected from the winding mechanism to permit resetting or zeroing of the counter when a complete roll of film is wound up.

A further object of the invention is the provision of an arrangement by which the disconnection of the counter is accompanied by movement of the film-winding locking mechanism to an inoperative position.

Yet another object of the invention is the provision an arrangement on the counter for holding or maintaining the film-winding locking mechanism in its inoperative position during the winding of the leader strip. After such winding, the holding mechanism on the counter is moved to an inoperative position to allow the locking mechanism to move to a position to lock the film winding mechanism.

Another object of the invention is the provision of cooperating elements on the counter and the metering lever to reset or zero the counter.

Still another object of the invention is the provision of a counter holding means which is simple, rugged and accurate in its results.

To these and other ends, the invention resides in certain improvements and combinations of parts, all as will be hereinafter more fully described, the novel features being pointed out in the claims at the end of the specification.

In the drawings:

Fig. 2 is a view similar to Fig. 1, but showing the relation of the parts at the end of the winding of the leader strip and in position to make the first exposure;

Fig. 3 is a partial view of the mechanism illustrated in Figs. 1 and 2, showing the relation of the counter and its associated parts at the end of the winding of the film strip. For the purpose of clarity, the counter pawls have been omitted.

Similar reference numerals throughout the various views indicate the same parts.

Figure 1:
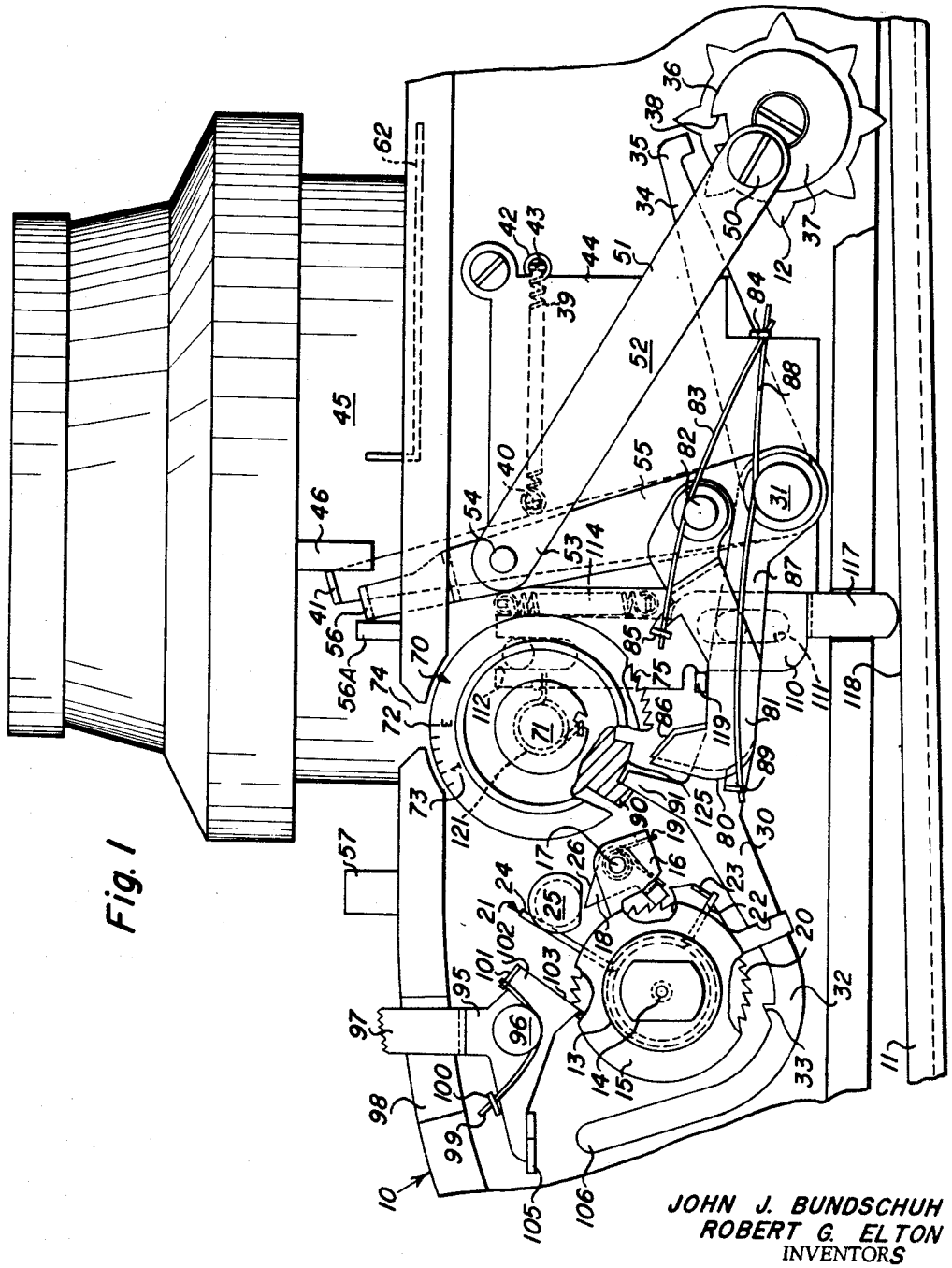
Fig. 1 is a bottom view of a camera housing, with the plate removed, showing the film metering and counter mechanism constructed in accordance with the present invention, with the camera back open and the parts in position to permit the windup of the leader strip.

Fig. 1 of the drawings shows a roll film camera having a body portion 10, the rear of which is provided with a movable back 11 which is connected to the body portion in any suitable and well known manner to enable the back to move to open position, see Fig. 1, or to a closed position, see Fig. 2, and for a purpose to be later described.

A film strip, not shown, is unwound from a supply spool, also not shown, passed over a measuring roll 12 and an exposure frame and finally wound up on the take-up spool 13 mounted on the take-up spindle 14. Each time the spindle 14 is actuated, a single image area is wound upon the spindle 14, and the latter is automatically locked, as will be later described. In order to actuate the spindle 14, the latter has mounted thereon and concentric therewith, a plate 15 formed with a radially extending ear or lug 16 on which is pivoted at 17, an operating pawl 18. A coil spring 19 is wrapped around pivot 17 and tends to rock the pawl 18 into engagement with the ratchet 20 carried by the spindle 14. Plate 15 is connected to an actuating arm or lever, not shown, positioned outside the camera body. A second coil spring 21 is wrapped around spindle 14 and has one end 22 secured to an ear 23 on plate 15, the other end 24 engaging a fixed stop 25 on the camera body. The spring 21 tends to rotate plate 15 with pawl 18 in a counterclockwise direction to the position illustrated in Fig. 2. When the plate 15 is first moved clockwise by its lever, spring 19 rocks pawl 18 into engagement with the ratchet 20. Furthermore, rotation of plate 15 then serves to rotate ratchet 20, spindle 14 and take-up spool 13 to wind the exposed film. Such rotation will tension spring 21. Upon release of the winding lever, the tensioned spring 21 returns plate 15 and its associated parts to the position shown in Fig. 1. Upon such return a cam 26 formed on pawl 18 engages the fixed stop 25. Such engagement will rock pawl 18 counterclockwise about pivot 17 to disengage pawl 18 from ratchet 20, as shown in Fig. 2. Thus, each time the plate 15 is rocked an exposure area is wound up on the take-up spindle. At the completion of the winding operation, the spindle is automatically locked against further actuation, as will be later described.

To secure this result, a metering lever, broadly designated by the numeral 30, is pivotally or rockably mounted at 31 on the camera body. One arm 32 of lever 31 is formed with a locking pawl 33 adapted to move into locking relation with the ratchet 20, see Fig. 2, at the end of the winding operation to prevent further rotation of spindle 14 and hence further movement of the film strip. Another arm 34 of lever 30 is provided with a pawl 35 which is adapted to ride on the periphery 36 of the plate 37 attached to and rotatable as a unit with the measuring roll 12. The plate 37 is formed with a single radial slot 38. The roll 12 and plate 37 are designed as to make a single revolution when the film strip is moved the distance of one image area. At that time, the roll 12 and plate 37 have been rotated one complete revolution to bring the notch 38 into registry with pawl 35. The lever 30 is then rocked clockwise about pivot 31 to move pawl 35 into notch 38, and simultaneously move pawl 33 into locking relation with ratchet 20. Such structure is well known and does not, per se, form a part of the present invention. The lever 30 is rocked clockwise by means of coil spring 39, one end 40 of which is attached to a third arm 41 of lever 30, the other end 42 of which is secured to an ear 43 formed on the mechanism plate 44. As seen in Fig. 1 and Fig. 2 the arm 41 extends upward from pivot 31, for a purpose to be later described.

While the wind-up spindle 14 is thus locked at the end of each winding operation, it is desirable to release the spindle after the shutter has been actuated so that the exposed image area may be wound up. To secure this result, the camera shutter, not shown, positioned in housing 45, is provided with a setting lever 46. As the shutter and the setting lever 46 thereof may be of any well-known construction and form no part of the present invention, further details are not deemed necessary. Suffice it to say, when the lever 46 is moved to the right from the position shown in Fig. 1, to the position illustrated in Fig. 2, the shutter will be set and ready for making an exposure.

Shutter setting lever 46 may be moved to a set position by any suitable means. However, it is desirable to connect the lever 46 to the film winding mechanism so that the shutter is set during the initial winding of the film, the advantage of which is apparent. To secure this result, plate 37 has eccentrically connected thereto at 50, one end 51, of a lever or pitman 52, the other end 53 of which is connected at 54 to a lever 55 rockably or pivotally mounted at 31. The lever 55 overlies the third arm 41 of the metering lever 30 as illustrated in Figs. 1 and 2.

Now, as spindle 14 is rotated to wind up the film, the measuring roll 12 and plate 37 have imparted thereto a single rotation which will impart a single reciprocation or rocking to lever 55. Such rocking of lever 55 will first move the latter clockwise about pivot 31 to bring lug 56 on the upper end thereof into engagement with the shutter setting lever 46 to move the latter from the position shown in Fig. 1 to the position shown in Fig. 2 to set the shutter. The balance of the rotation of roll 12 and plate 37 will rock lever 55 counterclockwise, about pivot 31 to return the lever 55 to its initial position shown in Fig. 1. Thus, during the initial winding of the film, lever 55 is rocked clockwise to set the shutter; and, after the shutter has been set, lever 55 is completely and automatically disconnected from lever 46 and is returned to its initial position. Also, after the shutter is set, the shutter is disconnected from the film winding mechanism. The shutter is now set and ready to make an exposure, and the film winding mechanism is locked as shown in Fig. 2.

Figure 4:
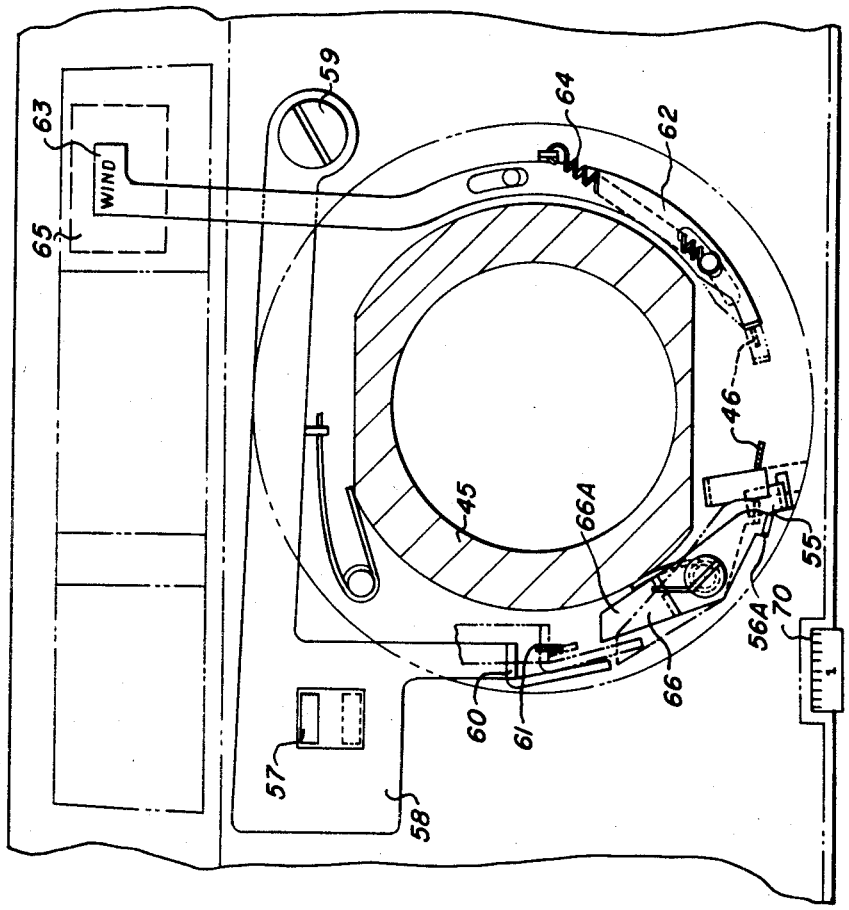
Fig. 4 is a back elevation view of a portion of the camera, with parts in section, showing the relation of the shutter setting and tripping members and the viewfinder target.

The shutter is tripped or actuated to make an exposure by moving the shutter trigger 57 downward, as viewed in Fig. 4. In the present embodiment trigger 57 is carried by an arm 58 pivoted at 59 to the camera body, see Fig. 4. When the trigger 57 is moved downward, arm 58 is rocked counterclockwise, see Fig. 4, about pivot 59 to move the lug 60 into engagement with the shutter release lever 61 to move the latter downward to trip the shutter to make an exposure. As the mechanism for connecting member 61 to the shutter forms no part of the present invention, details thereof are not shown.

When the lever 55 is rocked clockwise, as above described, during the winding of the film, shutter setter lever 46 is moved to the right, see Figs. 1 and 2 to set the shutter.

This clockwise movement of lever 55 moves the lug 56 thereof out of holding relation with a lug 56A of an interlock lever 66, and the latter then rocks counterclockwise to its dotted-line position, Fig. 4, under the action of spring 66A, to block the lug 60 to prevent further actuation of the shutter lever 61. Upon return of the lever 55 to its left position, after setting the shutter, the lug 56 reengages lug 56A to rock lever 66 clockwise to its solid line position, Fig. 4, to free lever 61, all is deemed apparent from Fig. 4. The interlock lever 66 is of the type shown and described in Patent 2,780,152, Harvey et al., and forms no part of the present invention.

Lever 46 is secured to or forms a part of an arcuate ring 62, see Fig. 4, the upper end of which carries a target 63, see Fig. 4. When the release lever 61 is actuated to make an exposure, the lever 46 and ring 62 move to the left, see Fig. 4, under action of a spring 64. Such movement of lever 46 and spring 62 moves the target 63 downward into the field of the viewfinder 65 to indicate the shutter has been tripped to make an exposure, and that the next operation is to wind the film.

From the above description, it is apparent that the film is moved one image area at a time, and at the end of each movement the film winding mechanism is locked against further movement. However, during the initial portion of the film winding operation, the shutter is tensioned or set. Then the set shutter is tripped to make an exposure and such tripping serves to move the shutter setting lever 46 to the left to cause the latter to engage the arm 41 of the metering lever 30 to rock arm 41 and hence lever 30 counterclockwise about pivot 31 against the action of spring 39. Such movement of the lever 30 will disengage the pawl 33 from the locking relation of ratchet 20 to unlock the film winding mechanism, and will also withdraw pawl 35 out of notch 38 of plate 37, secured to the measuring roll 12, as is deemed apparent. The lever 46 is held in engagement with arm 41 to maintain lever 30 in its disengaged or released position, as shown in Fig. 1. It is seen from Fig. 1 that lever 55 is positioned slightly to the left of lever 46 with the result that lever 55 must move a slight distance before engaging and moving lever 46 out of contact and holding relation with lever 41. This slight movement of lever 55 is such that the roll 12 will be moved slightly to shift notch 38 out of registry with pawl 35 before lever 55 moves the lever 46 out of holding relation with lever 41 to free the latter. Now, when lever 46 is moved to the right, lever 30 is free and will rock clockwise about pivot 31 under the action of spring 39 to move the pawl 35 into engagement with the periphery 36 of plate 37. This slight initial movement of lever 55 before engaging lever 46 might be termed "lost motion" connection between the film winding and the shutter setting.

Coming now to the main feature of the present invention, a counter, broadly designated by the numeral 70, is rotatably mounted on the camera body for movement about the axis 71. The counter is in the form of a cylindrical member or wheel, the periphery 72 of which is provided with exposure numbers 73 to indicate the number of exposures. These numbers 73 are visible through an aperture or opening 74 in the camera body. The periphery 72 of the counter is also provided with an annular ratchet member 75 by which the counter may be indexed in a step-by-step relation. The counter 70 is indexed by means of a counter pawl 80 formed on the free end of a lever 81 the other end of which is rockably or pivotally mounted at 82 to the shutter setting lever 55. A coil spring 83 is wrapped around pivot 82 and has one end anchored to a fixed ear 84 on 44 and the other end secured to an ear 85 formed on the lever 81. Spring 83 tends to rock lever 81 clockwise about pivot 82 to hold pawl 80 in engagement with the ratchet 75, as is deemed apparent. A check pawl 86 engages ratchet 75 and is formed on the free end of an arm 87 pivoted at 31. A coil spring 88 is wrapped around pivot 31 and has one end anchored to ear 84, and the other end engaging an ear 89 on arm 87 to hold pawl 86 in positive engagement with ratchet 75. The counter pawl 80 and the check pawl 86 are spaced a one-half tooth apart.

It is now deemed apparent that as lever 55 is rocked about pivot 31 by lever 52, the pawl lever 81 will move as a unit with lever 55. As the latter is rocked to the right to shift lever 46 to the right to set the shutter, the pawl 80 rides idly over the teeth of ratchet 75. The latter is held against reverse rotation during this time by means of check pawl 86. However, when the lever 55 is rocked to the left after the shutter is set, the lever 81 will also move to the left and the pawl 80 moves into engagement with ratchet 75 to move the latter the distance of one tooth. Such one-tooth movement of ratchet 75 moves the counter a distance sufficient to shift the next numeral 73 into position in registry with opening 74 to indicate another exposure has been made. This step-by-step movement of the counter with each winding of an image area is continued, preferably until the last exposure is made on the film roll. At that time, the counter has reached the position illustrated in Fig. 3 where a radially extending ear or finger 90 on the counter 70 has been moved to a position adjacent a fourth arm or lug 91 projecting from lever 30. When the counter 70 has moved to its final position, Fig. 3, the ratchet 75 has been rotated to bring mutilated or tooth-free portion 92 into registry with the counter pawl 80, as shown in Fig. 3, to stop further indexing of counter 70.

Now, after the last exposure has been made, the exposed film is rewound back onto the supply spool or back into the supply retort carried thereby, as is well known. During such rewinding it is desirable to free the metering roll 12 and the ratchet 20, for obvious reasons. To secure this result, the metering lever 30 is rocked counterclockwise about pivot 31 to withdraw pawl 35 out of notch 38 of the plate 37 and to move pawl 33 out of holding relation with ratchet 20. In addition, it is desirable to hold the lever 30 in its released or inoperative position during the entire rewinding of the various exposed image areas of the film strip, as well as the leader portion which was initially wound on the spindle 14. To this end, a rewind lever, generally indicated by the numeral 95, is rockably mounted at 96 on the camera body 10. An operating or finger-engaging portion 97 extends through an opening 98 in the camera body to a position exteriorly thereof. A coil spring 99 is wrapped around pivot 96 and has one end anchored to a fixed ear 100 on the camera body 10, and the other end secured to an ear 101 of arm 102 of lever 95. Spring 99 tends to rock lever 95 clockwise about pivot 96 to bring a lug or edge 103 on an arm of lever 95 into engagement with ratchet 20 to hold the spindle 14 against reverse rotation, as is deemed apparent from an inspection of Fig. 1. Now, when the film is to be rewound, lever 95 is rocked counterclockwise about pivot 96 to move lug 103 out of holding relation with ratchet 20 to permit reverse rotation thereof during the rewinding operation. Also, the left arm of lever 95 is rocked to the left about pivot 96 to bring cam 105 thereon into engagement with an extending end 106 of lever 30 to rock the latter counterclockwise about pivot 31 to remove pawl 33 out of holding relation with ratchet 20 and to move pawl 35 out of notch 38. The film winding mechanism is now free and may be rotated to rewind the film back onto the spool or into the supply retort.

It is apparent, however, that during such rewinding, the measuring roll 12 and plate 37 are rotated in a direction opposite to the rotation during the regular winding operation. This reverse rotation will, however, still impart a reciprocal motion to levers 55 and 81 to reciprocate the counter pawl 80. However, as the latter is in registry with tooth-free portion 92 of ratchet 75, no indexing of the counter 70 will occur, the advantages of which are deemed apparent.

In the present embodiment, the counter 70 is designed for use with a large exposure roll strip, such as a 36 exposure roll. At the end of the 36th exposure, the counter 70 is in the position shown in Fig. 3 and pawl 80 is in registry with portion 92 of ratchet 75, so that no movement of the counter takes place during the rewinding. However, the counter mechanism of the present invention is also suitable for use with a shorter film strip, such as a 20 exposure strip. It is obvious, of course, that at the end of 20 exposures, the counter will be positioned somewhere between the position shown in Fig. 2 and that shown in Fig. 3. In such an intermediate position, the counter pawl 80 still engages the tooth portion of the ratchet 75. Now, when the smaller exposure roll is rewound, lever 81 is reciprocated to move the pawl 80 to index the counter, and such indexing continues until the counter is moved to the position shown in Fig. 3 and the portion 92 is moved into registry with pawl 80 at which time further indexing of the counter 70 ceases. Thus, with a 36-exposure roll the counter remains stationary during the rewinding, but with a shorter roll, the counter is indexed an additional amount to move the counter to the final position shown in Fig. 3. Therefore, irrespective of the length of the film strip, the final position of the counter is the same.

By means of the above mechanism the counter is indexed step-by-step during the making of the exposures; and, is finally positioned at the end of its movement, as shown in Fig. 3. However, before the counter can be used again to indicate exposures, the counter must be reset to its original position or zeroed. Such zeroing may be performed in a variety of ways. In the present embodiment, however, such zeroing or resetting is controlled by the camera back in such a way that when the back is opened the counter is free so it will automatically rotate or move to its zero or initial position.

To this end, a counter release slide 110 is mounted within the camera body. This slide is in the form of a flat, metal plate having an elongated slot 111 and a U-shaped slot 112 to receive screws carried by the camera body to mount the slide 110 for sliding movement. A coil spring 114 has one end anchored on the camera body, and the other end secured to a lug carried by slide 110. The spring 114 tends to move slide 110 downward to bring a depending finger or lug 117 thereon into engagement with surface 118 of the camera back 11, as shown in Fig. 2. In this position, the slide 110 is inoperative. However, when the back 11 is opened, the surface 118 is moved out of supporting relation with lug 117, and the latter and slide 110 move downward to the position illustrated in Fig. 1, under the action of spring 114. The slide 110 is provided with an ear or lug 119 which, when the slide is moved downward, engages both pawls 80 and 86 to disconnect the pawls from the ratchet 75. Also, lug 119 engages the top of lever 30 to rock the latter counterclockwise about pivot 31 to a disengaged position to move the lug 91 to full retracted position, shown in Fig. 1. The counter 70 is now free.

The freed counter 70 then quickly and automatically rotates in a reverse or counterclockwise direction until the parts reach the position shown in Fig. 1, with lug 91 engaging the right face of finger 90 to limit reverse rotation of the counter and to zero the latter. Thus, finger 90 of counter 70 and lug 91 of lever 30 cooperate to reset or zero the counter 70. This reverse rotation of the counter is controlled by coil spring 121, one end of which engages a fixed pin on the camera body, and the other end is secured to an ear carried by the counter 70. When the counter 70 is zeroed, the parts are in the position shown in Fig. 1, and the free end of finger 91 is positioned adjacent a control surface or cam 125 formed on the counter 70. Preferably the cam 125 is of a length sufficient to hold the lever 30 out of locking relation with ratchet 20 during the winding of substantially three image areas, which constitute the length of the leader portion of the film strip.

With the back 11 in open position, the exposed and rewound film strip is removed from the camera, and a new and unexposed film strip is positioned therein. The leading end of the new strip is then anchored to the wind-up spindle and the back of the camera is closed to cause surface 118 of the back 11 to engage finger 117 to shift slide 110 upward against the action of spring 114. Such upward movement will shift lug 119 out of engagement with levers 81 and 87 and enable pawls 80 and 86 to move into engagement with ratchet 75. Also, lug 119 frees lever 30 and the free end of lug 91 of lever 30 comes to rest on cam 125. The latter has a length equal to three teeth of the ratchet 75 which is equivalent to the distance the counter is moved during the winding of the leader strip. Therefore, the lug 91 will remain in engagement with cam 125 during the winding of the entire length of the leader portion of the film strip. It will be apparent from Fig. 1, that while lug 91, is in contact with cam 125, the lever 30 is positioned to hold pawl 33 out of holding relation with ratchet 20 to free the winding mechanism to enable the leader portion to be wound up freely. However, at the end of the winding of the leader strip, the lug 91 will drop off cam 125, and the lever 30 will rock clockwise about pivot 31, under the action of spring 39, to cause pawl 35 to ride on the periphery 36 of plate 37. Now, a slight additional movement of the film brings notch 38 into registry with pawl 35 and the latter will drop into the notch 38 to cause a clockwise rocking of lever 30 about pivot 31 to move pawl 33 in locking relation with ratchet 20 to lock the film winding mechanism against further movement.

Thus, engagement of lug 91 with cam 125 will hold lever 30 out of locking relation with the ratchet 20 to permit an unobstructed winding of the leader portion of the new strip. However, at the end of this leader-winding operation, the lug 91, will ride off cam 125 to free lever 30 which is now controlled by the measuring roll 12 to lock the film winding mechanism automatically. During the winding of the three image area, which represents the leader strip, the measuring roll 12 is rotated to operate lever 52 to rock lever 55 to move the latter to the right and into engagement with lever 46 to move the latter to the right to set the shutter, as above described. Thus, the shutter is set during the winding of the leader strip so that when the first image area is moved to position, the shutter is set ready for operation to make an exposure. At this time the numeral "1" of the counter 70 is moved into position in opening 74 to indicate that the first exposure is for use, as shown in Fig. 2.

The present invention thus provides a counter, the operation of which is controlled by the film movement so the counter will be actuated in proper timed reaction to the winding of the film. Also, means is provided for automatically zeroing or setting the counter after the final winding operation has been completed. Furthermore, means is provided to maintain the locking means for the film winding in an inoperative position during the winding of the leader portion to permit the free and unobstructed winding of the latter. The counter mechanism of the present invention is simple in design, comprises few parts of rugged construction, and is highly effective in operation. Also, cooperating parts on the counter and the metering lever reset or zero the counter.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What we claim and desire to secure by Letters Patent of the United States of America is:

1. In a roll film camera having a camera body provided with a back which is movable between open and closed positions, a rotatable take-up spindle rotated in one direction to advance a film strip for exposure; a ratchet on said spindle; an indexable exposure counter mechanism; including a counter dial, a ratchet fixed to said dial and a spring normally urging said dial to its zero position; a rotatable film feed measuring member on said body rotated by said film as it is advanced; means connecting said film measuring member to said counter dial whereby as each exposure is fed said dial is indexed one increment, said means including a feeding pawl for said ratchet operated by said film measuring member and a locking pawl engaging said counter ratchet to hold it against said spring; a second movable locking pawl; means controlled directly by said film measuring member to permit said last mentioned pawl to move into locking engagement with said spindle ratchet when a predetermined length of film has been advanced; and means for automatically disengaging said first locking pawl and said feeding pawl from engagement with said counter dial ratchet when said camera back is opened to permit said counter dial to return to zero, said last mentioned means including a slide member mounted on said body to move between an operative position, wherein it engages and moves said feed and locking pawls from engagement with said counter dial ratchet, and an inoperative position, wherein it allows said pawls to re-engage said ratchet; and a connection between said slide member and said camera back whereby the slide member is moved to its inoperative position when said back is closed and is moved to its operative position when the back is open.

2. A roll film camera according to claim 1 and including a connection between said spindle ratchet locking pawl and said slide member whereby said pawl is moved from engagement with said ratchet to free the spindle when said camera back is opened and is freed for re-engagement with said spindle ratchet when the back is closed.

3. In a roll film camera having a camera body provided with a back which is movable between opened and closed positions; a rotatable take-up spindle rotated in one direction to advance a film strip for exposure; a ratchet on said spindle; an indexable exposure counter mechanism including a counter dial, a ratchet fixed to said dial, and a spring normally urging said dial to its zero position; a rotatable film feed measuring roll on said body rotated by said film as it is advanced; means connecting said measuring roll to said counter dial whereby as said film is advanced for a successive exposure said dial is indexed one increment, said means including a feeding pawl normally engaging said dial ratchet and operated by said measuring roll, and a locking pawl normally engaging said dial ratchet to hold it against said spring; a second movable locking pawl; means controlled directly by said measuring roll to permit said second locking pawl to move into locking engagement with said spindle ratchet to lock the same when a predetermined length of film has been advanced; means for automatically disengaging each of said pawls from engagement with their respective ratchets when said camera back is opened to permit said counter dial to return to zero under the action of its spring and to permit the winding of a new film onto said take-up spindle, said last mentioned means including a slide member mounted on said body member to move between an operative position, wherein it engages and moves each of said pawls from engagement with their respective ratchets, and an inoperative position, wherein it frees said pawls to return to re-enegagement with their respective ratchets, a connection between said slide member and said camera back whereby the slide member is moved to its inoperative position when said back is closed and is moved to its operative position when said back is open; a lug on said spindle locking pawl, a cam surface on said counter dial adopted to be engaged by said lug when said dial is in its zero position and said camera back is closed for holding said spindle locking pawl out of engagement with the spindle ratchet during the advance of a length of film corresponding to the length of a leader portion on the film strip.

References Cited in the file of this patent

UNITED STATES PATENTS 2,652,209     Hodges _____ Sept. 15, 1953

FOREIGN PATENTS 709,981     Great Britain _____ June 2, 1954